United States Patent
Vaillant et al.

(10) Patent No.: US 8,725,864 B2
(45) Date of Patent: May 13, 2014

(54) COMMUNICATION MANAGEMENT NETWORK SYSTEM AND METHOD FOR MANAGING A COMMUNICATION NETWORK

(75) Inventors: Stefan Vaillant, Dusseldorf (DE); Stephen Seiler, Hilden (DE)

(73) Assignee: Nokia Siemens Networks Oy, Espoo (FI)

( * ) Notice: Subject to any disclaimer, the term of this patent is extended or adjusted under 35 U.S.C. 154(b) by 3360 days.

(21) Appl. No.: 11/070,666

(22) Filed: Mar. 3, 2005

(65) Prior Publication Data

US 2006/0109800 A1 May 25, 2006

(30) Foreign Application Priority Data

Nov. 25, 2004 (EP) .................... 04 027 999

(51) Int. Cl.
*G06F 15/173* (2006.01)
(52) U.S. Cl.
USPC ............ 709/224; 709/220; 709/223; 370/254

(58) Field of Classification Search
USPC ......................................... 709/223, 220, 224
See application file for complete search history.

(56) References Cited

U.S. PATENT DOCUMENTS

| | | | | |
|---|---|---|---|---|
| 5,802,146 A | * | 9/1998 | Dulman | 379/32.03 |
| 2001/0004745 A1 | * | 6/2001 | Villalpando | 709/223 |
| 2001/0012297 A1 | * | 8/2001 | Hrastar et al. | 370/401 |
| 2002/0032761 A1 | * | 3/2002 | Aoyagi et al. | 709/223 |

\* cited by examiner

*Primary Examiner* — Thu Ha Nguyen
(74) *Attorney, Agent, or Firm* — Squire Sanders (US) LLP

(57) ABSTRACT

A mechanism usable in a communication management network system includes a network element and an operations system portion. After the network element is physically connected to the operations system portion, adaptation information is transmitted from the network element to the operations system. The operations system configures one or more applications on the basis of metadata which are accessed by using the adaptation information. The network element and all further network elements of the same type/release are manageable by the operations system portion.

33 Claims, 4 Drawing Sheets

COMMUNICATION MANAGEMENT NETWORK SYSTEM AND METHOD FOR MANAGING A COMMUNICATION NETWORK

BACKGROUND OF THE INVENTION

1. Field of the Invention

The present invention relates to a managing mechanism used in a communication network. In particular, the present invention relates to a method of managing a communication network, a communication management network system, a device usable in a communication management network system, and a network element connectable to an operations system portion of a communication management network system.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular $3^{rd}$ generation communication networks like the Universal Mobile Telecommunications System (UMTS), the General Packet Radio System (GPRS), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches the data transmitted via the communication connection to a destination party, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the user equipment and another user terminal, a database, a server, etc., one or more intermediate network elements such as control network elements, support nodes or service nodes are involved.

With the size and sophistication of communication systems, such as telecommunication networks rapidly expanding, it becomes necessary to provide proper services to manage the communications. For example, services such as configuration, accounting, performance, security and the like are important elements of managing critical resources within large distributed telecommunications networks. For this purpose, in case of a telecommunication system, so-called telecommunication management network (TMN) concepts are used to manage several types of networks, such as high-speed fiber-optic networks to distributed cellular and satellite based wireless communication systems.

Within such a TMN, the management system consists of several types of components. These components includes, amongst others, an operations system (OS) or operations subsystem which monitors, coordinates and controls telecommunication functions, a data communication network, workstations providing a user the ability to monitor and interact with the network management system, network elements providing agent services, such as network communications equipment like a Radio Network Controller (RNC), proxy agents or the like. The OS provides management services that provide for the surveillance, monitoring and control of the managed network, interacting with components within the network to gather information and issue commands that may affect the behavior of the network. A network element may comprise one component, a group of components or a part of a telecommunication equipment being part of the telecommunication network.

TMN specifies a layered architecture for the management of telecommunication networks. The TMN is related to monitoring, control and coordination of resources in the network. Resources are components of a system which provides for services.

Management functions are divided into sub-components such as configuration management, fault management, performance management, accounting management and security management. These functions are provided by means of applications.

A network management architectures typically includes the use of two primary components, which are also called managers and agents. Managers provide a higher level perspective of system performance monitoring and controlling the behaviour of the managed devices. Agents are processes that reside at the managed device and can provide the managers with insight into the managed equipment status.

A manager can be connected to more than one agent. On the other hand, one agent can be connected to more than one manager. A manager and an agent communicate with each other by means of management protocols. These protocols may include, for example, common management information protocols (CMIP), simple network management protocols (SNMP) and the like.

The SNMP provides a set of services that allows SNMP managers to interact with SNMP agents that provide access to management information of the managed equipment (and/or software). This management information is represented by a construct called a Management Information Base (MIB) that is defined through a set of primitives. MIBs are constructed of individually addressable objects that can take a variety of forms depending on the managed application and the version of SNMP. The protocol itself provides a set of mechanisms for the managers and agents to exchange values of elements contained within a MIB.

In the case that a new network element (a new type or release/version of a network element) is to be connected to a telecommunication network, also a connection to the TMN is to be established in order to ensure that the network element can be managed by the operations system of the TMN. For such an "integration" of a new network element, in case the SNMP concept is used, SNMP MIB definitions written down in MIB files are downloaded by developers or system integration persons and the operations system is manually configured by using these MIB definition. An example for such MIB definition is given, for example, in "MIB Quick Reference for the Cisco ONS 15500 series", Cisco Systems, Inc., 2001-2004, available by the Internet. An example for a configuration procedure is given, for example, in "Adding Cisco Traps to HPOV for Windows Traps Using a GUI", document ID 13442, Cisco Systems, Inc., Jun. 11, 2002.

As mentioned above, in the environment of such a TMN, there can exist many types and releases or versions of network elements. Nevertheless, all these different network elements are to be connected to the operations system so that the management of the overall network is ensured.

However, connecting a new network element type or release to an operations system is a work-intensive process also requiring the work of a person such as the software developer or system integration persons or network operators. For example, specific information about the network element must be gathered and configured into the operations systems. Even with standard protocols such as 3GPP or SNMP, properties that are specific to the network element require manual work in the operations systems. For example, with SNMP MIB definitions, which are specific for a certain network element, information from the SNMP MIB definition has to be configured into the OS. This is time consuming and expensive and may also lead to errors in the adaptation of the operations system to the network element.

The properties requiring manual work may include, for example, but are not limited to, additional properties needed for the visualisation of the network element in the OS user interface, such as the provision of corresponding icons, description text and/or labels, limitations or extensions of the Operation and Maintenance (O&M) protocol implementation (so-called "Statement of Compliancy"), structure of the transferred configuration management data (managed object classes, attributes, containment hierarchy, inheritance tree, value constraints), structure and meaning of the transferred performance management data (measurement types, counter names and descriptive text), additional help texts for e.g. fault management events, adaptations to the generic OS applications, such as filtering rules, aggregation rules, correlation rules, rules for converting SNMP traps into faults, etc.

SUMMARY OF THE INVENTION

Thus, it is an object of the invention to provide a mechanism for managing a communication network in which the effort in a communication management system for integrating and connecting a new network element type/release thereto is reduced.

In particular, it is an object of the invention to provide an improved mechanism for managing a communication network which allows to reduce the work necessary at the operations system side when adapting a network element type/release newly connected to an operations system of the management network.

This object is achieved by the measures defined in the attached claims.

In particular, according to one aspect of the proposed solution, there is provided, for example, a method of managing a communication network, wherein the communication network comprises a network element and an operations system portion, the method comprising the steps of transmitting, after the network element is physically connected to the operations system portion, adaptation information from the network element to the operations system, processing the adaptation information in the operations system portion, configuring one or more applications in the operations system portion on the basis of the adaptation information, and executing a management process of the network element by the operations system portion.

Furthermore, according to one aspect of the proposed solution, there is provided, for example, a communication management network system for managing a communication network, the system comprising a network element and an operations system portion, wherein the network element is adapted to transmit, after the network element is physically connected to the operations system portion, adaptation information to the operations system, and wherein the operations system portion comprises a processor for processing the adaptation information in the operations system portion, and configuring means for configuring one or more applications in the operations system portion on the basis of the adaptation information,
wherein the operations system portion is adapted to execute a management process of the network element.

Moreover, according to one aspect of the proposed solution, there is provided, for example, a device usable in a communication management network system for managing a communication network, the device is comprised by an operations system portion and is adapted to receive, after physically connecting a network element to the operations system portion, adaptation information from the network element, and wherein the device further comprises a processor for processing the adaptation information, and configuring means for configuring one or more applications in the operations system portion on the basis of the adaptation information, wherein the operations system portion is adapted to execute a management process of the network element.

Additionally, according to one aspect of the proposed solution, there is provided, for example, a network element connectable to an operations system portion of a communication management network system for managing a communication network, wherein the network element is adapted to transmit, after the network element is physically connected to the operations system portion, adaptation information to the operations system being usable by the operations system portion for configuring one or more applications in the operations system portion, wherein the operations system portion is adapted to execute a management process of the network element.

According to further refinements, the proposed solution may comprise one or more of the following features:
  the adaptation information may comprise metadata defining parts of the network element manageable by the operations system portion;
  the adaptation information may comprises identification data of the network element, wherein the identification data of the network element may comprises, for example, type and release information of the network element;
  the managing mechanism may further comprise measures for contacting, after the processing of the adaptation information, a library network part, for requesting, from the library network part, additional adaptation information for the network element on the basis of the identification data, for receiving, from the library network part, the additional adaptation information for the network element, wherein the configuration of one or more applications of the operations system portion may be based on the additional adaptation information received from the library network part;
  the adaptation information may also comprise one of metadata defining parts of the network element manageable by the operations system portion or identification data of the network element. In such a case, the managing mechanism may comprise measures for determining, after the processing of the adaptation information, a sort of the adaptation information for distinguishing whether the network element transmitted metadata or identification data. Then, the managing mechanism may comprise measures for, in the case that the determination results in that the adaptation information comprises metadata, configuring the one or more applications of the operations system portion on the basis of the adaptation information from the network element. Otherwise, in the case that the determination results in that the adaptation information comprises identification data, the managing mechanism may comprise measures for contacting a library network part, for requesting, from the library network part, additional adaptation information for the network element on the basis of the identification data, for receiving, from the library network part, the additional adaptation information for the network element, wherein the configuration of the one or more applications of the operations system portion is based on the additional adaptation information received from the library network part;

the configuration may in particular include a configuration of at least one of a configuration management subcomponent, a performance management subcomponent, an accounting management subcomponent, a security management subcomponent, and a fault management subcomponent;

the configuration may comprise at least one of an addition of properties needed for the visualisation of the network element in a user interface, limitations of the Operation and Maintenance protocol implementation, extensions of the Operation and Maintenance protocol implementation, structure of transferred configuration management data, structure and meaning of transferred performance management data, additional help texts for fault management events, adaptations to generic operations system applications;

the configuration may also comprise at least one of a reconfiguration of a database scheme, a modification of relevant database tables, a creation of new database tables, a modification of a graphical user interface, and a modification of a messaging system;

the managing mechanism may further comprise measures for requesting the adaptation information from the network element by the operations system portion after the establishment of the physical connection between the network element and the operations system portion;

the managing mechanism may be implemented in a communication management network.

By virtue of the proposed solutions, the following advantages can be achieved:

The proposed mechanism allows an adaptation of a network element type/release to an operations system with a significantly reduced effort. Preferably, the network element provides all necessary information for its adaptation when it is first connected to the operations system. After this initialization the network element is manageable with no further adaptation steps needed, and this applies also for all later connected network elements of the same type/release. In other words, an automated adaptation process for the management of a network element type/release is achievable.

The automation can be further improved when the adaptation information are transmitted to the operations system in form of metadata in a predetermined format. Then, the adaptation effort at the operations system side can be further reduced to almost zero.

The proposed mechanism is also advantageous for future releases or updates of network elements to be connected to the operations system since the proper adaptation of the network element and the operations system to each other only requires a simply exchange of new metadata information.

It is also advantageous that by means of the present invention customers are able to receive basic support for a network element immediately with the network element itself, i.e. there is no release synchronisation problem between the network element and the operation support system.

By using a library network part for storing and retrieving the adaptation information, i.e. the metadata, of the network element, it is possible archive the metadata at a centralized location so that updates or the like are achievable for the adaptation processing as soon as possible. Furthermore, when the network element transmits only the identification data when it is connected to the operations system, storage capacity in the network element can be saved, and the operations system can access to the most current version of application information (metadata) achievable.

By using the proposed mechanism, R&D costs can be reduced significantly. Furthermore, the time-to-market for the O&M support for new network element can be improved.

The above and still further objects, features and advantages of the invention will become more apparent upon referring to the description and the accompanying drawings.

DESCRIPTION OF PREFERRED EMBODIMENTS

In the following, embodiments of the present invention are described with reference to the drawings.

A first embodiment is illustrated in connection with FIGS. 1 and 3.

Figure 1:
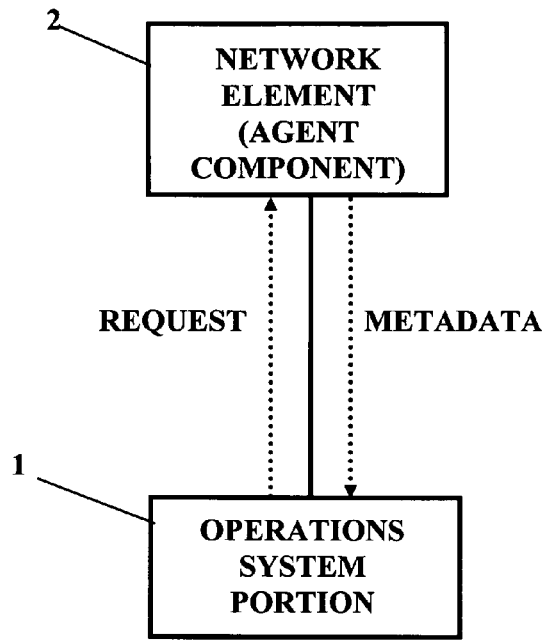
FIG. 1 shows a block diagram of a communication management network system according to a first embodiment of the invention.

In FIG. 1, a block diagram of a communication management network system is shown. According to FIG. 1, reference sign 1 denotes an operations system portion which is part of a managing network component (manager component) of a communication management network, which is, for example, but not limited to a telecommunication management network (TMN). Reference sign 2 denotes a network element representing or being part of an agent component.

It is to be noted that the system according to FIG. 1 represents a simplified architecture of a communication management network in which the present invention is implemented. Furthermore, the network element (agent component) and the operations system portion (manager component) described herein may be implemented by software or by hardware. In any case, for executing their respective functions, correspondingly used devices or network elements comprise several means which are required for control, processing and communication functionality. Such means may comprise, for example, a processor unit for executing instructions and processing data, memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), and interface means for establishing a communication connection under the control of the processor unit (e.g. wired and wireless interface means, an antenna, and the like).

Figure 3:
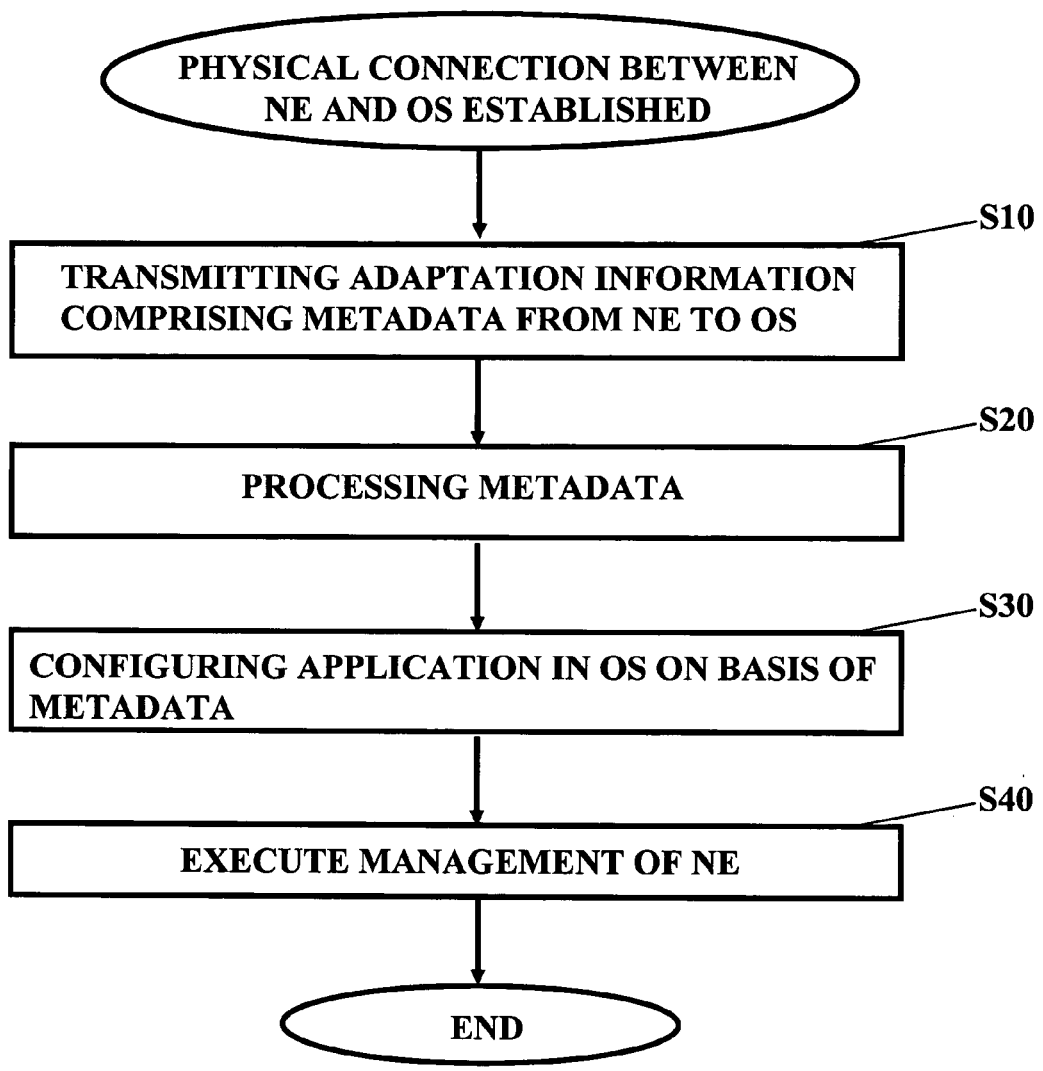
FIG. 3 shows a flow chart of a managing method according to the first embodiment.

Also with reference to FIG. 3, a managing mechanism for the communication management network system of FIG. 1 is described.

When the network equipment 2 is physically connected to the communication management network system, i.e. to the operations system portion 1, which is indicated in FIG. 1 by means of a solid line, the network element 2 transmits adaptation information to the operations system portion 1 (step S10 in FIG. 3). This transmission is indicated in FIG. 1 by means of a dotted arrow on the right side.

According to the first embodiment, the adaptation information comprises metadata stored in advance into a memory of the network element 2. Metadata represent a general known concept for machine understandable information for networks and are "data about data". They are used, for example, to describe the content, quality, condition, and other characteristics of data.

In the present case, the metadata describes manageable parts of the type/release of the network element 2. In other words, the network element 2 provides all necessary information for its connection (and that of the same type/release thereof) to the operations system by means of the metadata.

In general, the present invention is related to all manageable parts of a network element. These parts comprise, for example, functional management areas or subcomponents like Configuration Management (CM), Performance Management (PM), Accounting Management (AM), Security Management (SM), Fault Management (FM), at the respective network element. This includes, for example, but is not limited to, additional properties needed for the visualisation of the network element in the OS user interface, such as the provision of corresponding icons, description text and/or labels, limitations or extensions of the Operation and Maintenance (O&M) protocol implementation (so-called "Statement of Compliancy"), structure of the transferred configuration management data (managed object classes, attributes, containment hierarchy, inheritance tree, value constraints), structure and meaning of the transferred performance management data (measurement types, counter names and descriptive text), additional help texts for e.g. fault management events, adaptations to the generic OS applications, such as filtering rules, aggregation rules, correlation rules, rules for converting SNMP traps into faults, etc.

The adaptation information and metadata is metadata describing the data that is transferred from the network element to the OS. The data is CM data, FM data, PM data, etc. For examples, CM data includes so called managed objects with attributes. The CM metadata describes which managed objects types the network element supports and an icon, a textual description, etc. In SNMP terms, CM data is in the MIB (amongst other data), while the metadata is the text file that can be downloaded. PM data includes counter values. PM metadata includes the name of the counter, a textual descriptions, rules for how to aggregate the values.

The transmission of the application information, i.e. of the metadata, is caused, for example, by means of a request transmitted by the operations system portion 1 to the network element 2 as soon as it becomes aware of the establishment of the physical connection of the network element 2. The operations system becomes aware of a new network element, for example, after the network element is turned on. Alternatively, it becomes aware of the new network element by means of a message or command from an end-user (e.g. "connect to new NE on IP address 12.12.12.12"). Another possibility is a so called IP network discovery (executing a ping on random IP addresses and/or traversing MIBs of already known network elements).

As an alternative way (not shown) for causing the transmission of the adaptation information, the network element may be adapted to transmit the adaptation information via a predetermined interface as soon as it is activated (in which case it can be assumed that a physical connection is established). The transmission can be aborted as soon as an acknowledgement or the like is received by the network element 2 via the interface.

In FIG. 3, when the operations system portion 1 receives the application information including the metadata, a processing step of the metadata is executed (step S20). In this processing step, the information about the type/release of the network element 2 which is included in the metadata are recognized. In other words, the operations system portion 1 derives the information on the manageable parts of the type/release of the network element 2 and uses the same in the further processing, like validating the information and transforming it into the internally required format.

The further processing of the operations system portion 1 includes a step of configuring one or more applications thereof on the basis of the information included in the metadata received from the network element 2 (step S30). This means that the operations system portion 1 interprets the metadata information for adjusting/adapting the management applications and/or software in the operations system portion 1 so that the network element type/release can be managed by the operations system portion 1. For example, the operations system is adapted to reconfigure a database scheme, such as modifying relevant database tables or creating new ones, to modify graphical user interfaces (GUI), messaging system etc.

When the configuration process is finished, the operations system portion 1 executes the management of the network element 2 (step S40). This includes, for example, the activation of the network element so that a data flow from the network element can be started. Then, the procedure ends.

Figure 2:
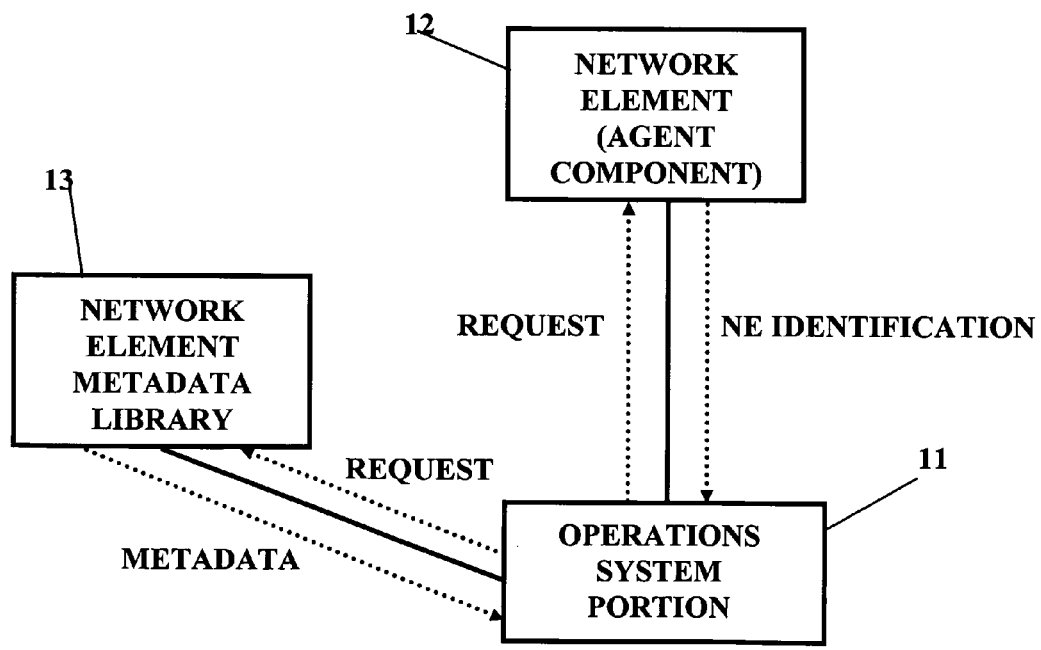
FIG. 2 shows a block diagram of a communication management network system according to a second embodiment of the invention.
Figure 4:
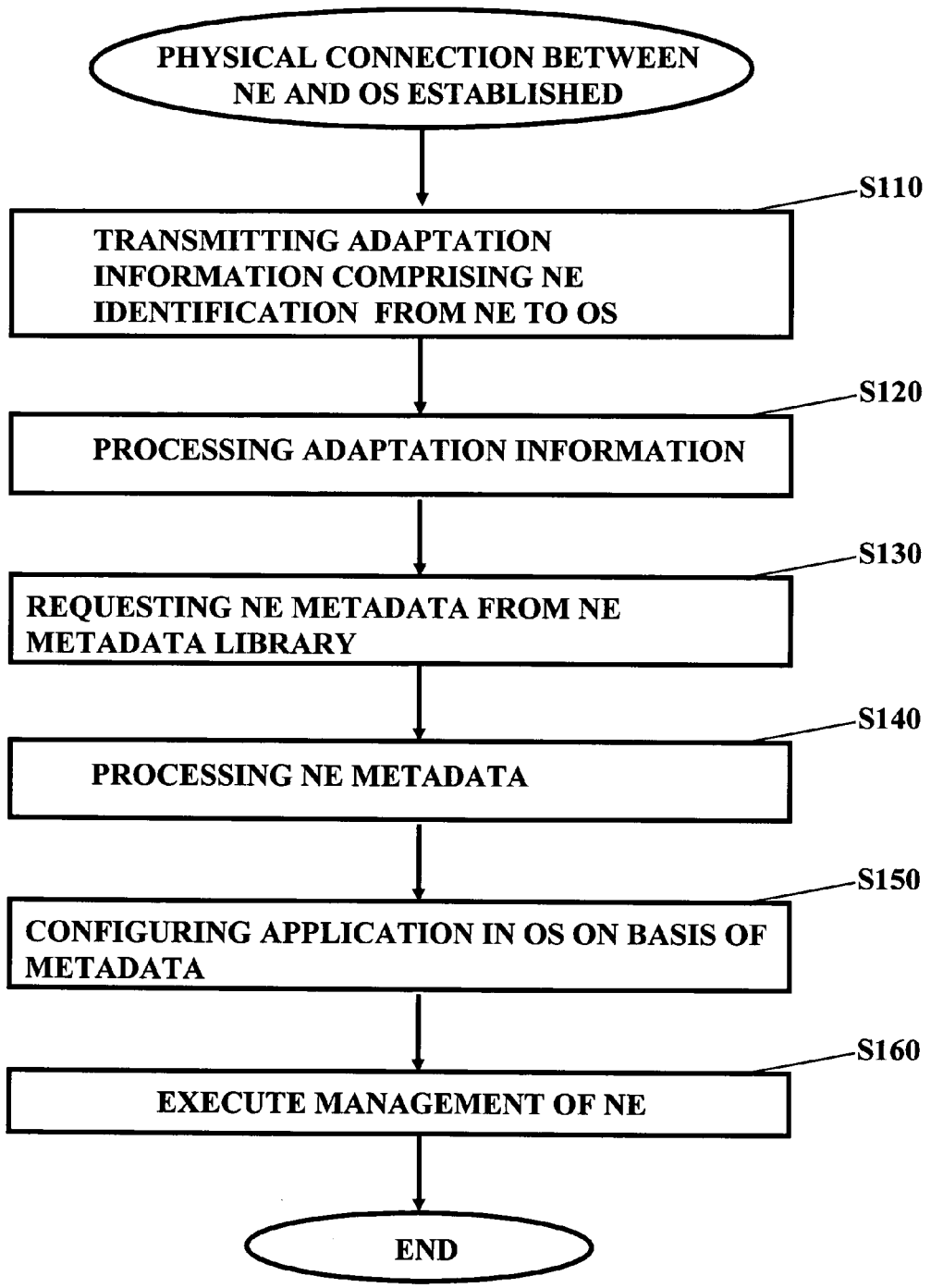
FIG. 4 shows a flow chart of a managing method according to the second embodiment.

In FIGS. 2 and 4, a second embodiment is illustrated.

In FIG. 2, a block diagram of a communication management network system is shown. Similar to the first embodiment, according to FIG. 2, reference sign 11 denotes an operations system portion which is part of a managing network component (manager component) of a communication management network (such as, but not limited to, a TMN), and reference sign 12 denotes a network element representing or being part of an agent component. Furthermore, reference sign 13 denotes a network element metadata library which is, for example, an external database storing metadata information describing manageable parts of several types and releases of different network elements being connectable to the operations system. The network element metadata library 13 is connectable to the operations system portion 11.

It is to be noted that also the system according to FIG. 2 represents a simplified architecture of a communication management network in which the present invention is implemented. Furthermore, the network element (agent component) and the operations system portion (manager component) described herein may also be implemented by software or by hardware and comprises the same components as described in connection with the first embodiment.

With reference to FIG. 4, a managing mechanism for the communication management network system of FIG. 2 is described.

When the network equipment 12 is physically connected to the communication management network system, i.e. to the operations system portion 11, which is indicated in FIG. 2 by means of a solid line, the network element 12 transmits adaptation information to the operations system portion 11 (step S110 in FIG. 4). This transmission is indicated in FIG. 2 by means of a dotted arrow on the right side.

According to the second embodiment, the adaptation information comprises identification data identifying, for example, the type and release of the network element 12.

The transmission of the application information, i.e. of the identification data, is caused, for example, by means of a request transmitted by the operations system portion 11 to the network element 12 as soon as it becomes aware of the establishment of the physical connection of the network element 2 (for example, after the network element is turned on, by means of a message or command from an end-user, by a so called IP network discovery). Also the alternative way described in the first embodiment concerning the transmission of the application information as soon as the network element is turned on may be applicable.

In other words, the network element 12 replies to a request for adaptation information by the operations system portion 11 by transmitting identification data identifying itself (or its type) and its release.

In FIG. 4, when the operations system portion 11 receives the application information including the identification data of the type/release of the network element 12, a processing step of the application information is executed (step S120). In this processing step S120, the identification data of the type/release of the network element 2 are derived from the application information received from the network element 12 and used for further processing.

In this further processing, the operations system portion contacts the network element metadata library 13 and requests further application information for the specific network element type/release by using the identification data received (step S130). The network element metadata library 13 looks up for the metadata for the type/release of the network element 12 on the basis of the identification data received by the request from the operations system portion 11 and transmits the metadata found in its database for the type/release of the network element 12 to the operations system portion 11. In the present case, the metadata which are stored in advance in the network element metadata library 13, describes the manageable parts of the type/release of the network element 12. In other words, the network element 12 provides the necessary information to the operations system portion 11 so that necessary adaptation information for the connection of the type/release of the network element 12 to the operations system can be derived from the network element metadata library 13 by means of metadata.

When the operations system portion 11 receives the reply from the network element metadata library 13, i.e. the metadata for the type/release of the network element 12, a processing of the metadata received from the network element metadata library 13 is executed (step S140), similarly to the first embodiment. This means that the operations system portion 11 derives the information on the manageable parts of the type/release of the network element 12 and uses the same in the further processing, like validating the information and transforming it into the internally required format. In other words, when the operations system portion 11 receives the identification data from the network element 12, it downloads the metadata information for that specific type/release of the network element from an online library, for example, on the Internet.

The further processing of the operations system portion 11 includes a step of configuring one or more applications thereof on the basis of the information included in the metadata received from the network element metadata library 13 (step S150). This means that the operations system portion 11 interprets the metadata information for adjusting/adapting the management applications and/or software in the operations system portion 11 so that the type/release of the network element 12 can be managed by the operations system portion 11. When the configuration process is finished, the operations system portion 11 executes the management of the network element 12 (step S160). This includes, for example, the activation of the network element 12 so that a data flow from the network element can be started. Then, the procedure ends.

The second embodiment is usable, for example, in cases where the network element is not capable of storing the metadata necessary for the adaptation of the operations system, or when the metadata information can not be transmitted by the network element. Furthermore, the second embodiment is usable in a case where the data included in the metadata information are frequently changed, e.g. in cases of frequent update processes for a network element type.

Figure 5:
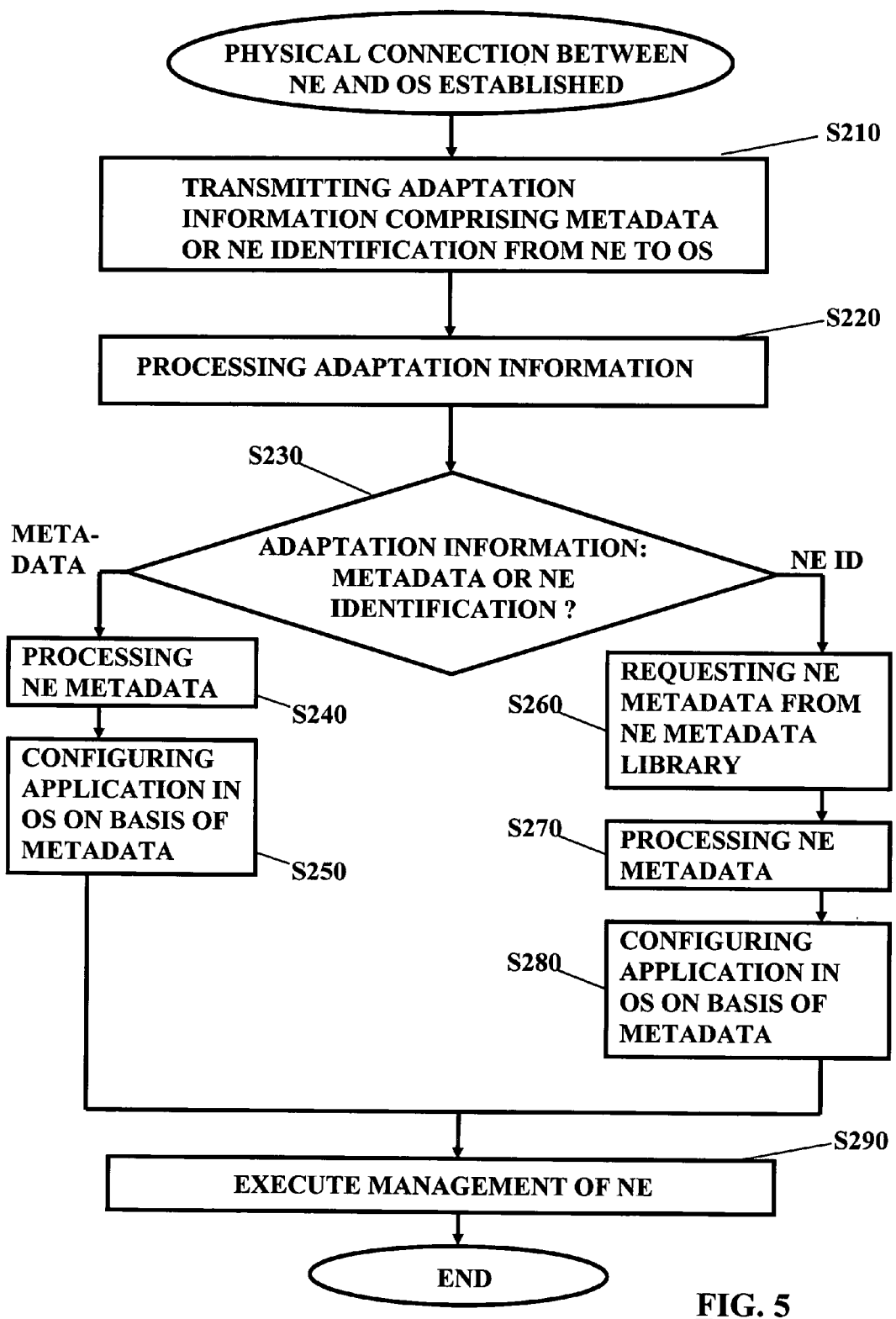
FIG. 5 shows a flow chart of a managing method according to a third embodiment.

In FIG. 5, a third embodiment of the invention is described. The third embodiment represents a combination of the features described in the first and second embodiment.

A communication management network system architecture usable for the third embodiment is basically equivalent to that shown in FIG. 2 of the second embodiment. This means that the communication management network system of the third embodiment comprises an operations system portion 11, a network element 12 and a network element metadata library 13.

In contrast to the second embodiment, the network element 12 according to the third embodiment is either adapted to transmit adaptation information including metadata or identification data (step S210 in FIG. 5). Which sort of application information is actually transmitted may depend, for example, on the type or release of the network element 12.

In step S220, the received adaptation information is processed in the operations system portion 11. This means that it is determined which sort of application information is received, i.e. metadata or identification data.

When it is distinguished in step S230 that the adaptation information from the network element comprises metadata information, steps S240 and S250 are executed. These steps S240 and S250 correspond to steps S20 and S30 of the first embodiment so that a detailed description thereof is omitted. Briefly, the configuration in the operations system portion 11 is executed on the basis of the metadata information received directly from the network element 12.

On the other hand, when it is distinguished in step S230 that the adaptation information from the network element comprises identification data, steps S260 to S280 are executed. These steps S260 to S280 correspond to steps S130 to S150 of the second embodiment so that a detailed description thereof is omitted. Briefly, the configuration in the operations system portion 11 is executed on the basis of the metadata information received indirectly from the network element 12, i.e. by means of the network element metadata library 13.

In step S290, like in the first and second embodiments, when the configuration process is finished, irrespective of whether based on the metadata directly received from the network element 12 or from the network element metadata library 13, the operations system portion 11 executes the management of the network element 12.

Preferably, in the embodiments described above, the format of the metadata information to be transmitted is standardized for all network element types. Thus, it is possible that the operations systems portion receiving the adaptation information (or the metadata) is able to execute the managing mechanism for a variety of network elements.

It is to be noted that the present invention is applicable for all network elements that need to be managed. For example, such network elements include GSM network elements (such as BSC, BTS, MSC, GGSN, SGSN, SMSC, MMSC and the like), 3G/WCDMS network elements, WLAN network elements, IP network elements (routers, hubs, switches, firewalls, gateways, and the like), Server computers (i.e. normal servers hosting application software, web servers, file servers, printer servers, and the like), Desktop PCs, PDA, mobiles and the like.

By means of the present invention, it is possible that the communication management network or the operations system becomes aware of a newly connected network element. Then, the managing mechanism is able to automaticaly modify relevant database tables or to create new ones, to modify graphical user interfaces (GUI), messaging system etc. in such a way that they can deal with the new NE type and its data, i.e. that the network element is manageable by the operations system. In other words, the present invention provides a mechanism which prepares an operations system to be able to connect any network element of a specific type/release to the operations system.

The adaptation of the network element and the operations system in the communication management network or operations system is possible with a significantly reduced effort. The network element provides all necessary information when first connected to the operations system. After this initialization step the network element is manageable with no further steps needed. This can be achieved in that each network element is describing itself with metadata. When the operations system connects to the network element, the operations system retrieves the metadata from the network element (directly or indirectly). By using the metadata from the network element, the software of the operations system is configured such that the network element is manageable from the operations system.

As described above there is described a mechanism usable in a communication management network system comprising a network element and an operations system portion, wherein, after the network element is physically connected to the operations system portion, adaptation information is transmitted from the network element to the operations system. The operations system configures one or more applications on the basis of metadata which are accessed by using the adaptation information. Then, the network element and all further network elements of the same type/release are manageable by the operations system portion.

The invention claimed is:

1. A method, comprising:
receiving, after a network element is physically connected to an operations system portion, adaptation information from the network element in the operations system portion, wherein the adaptation information comprises metadata defining parts of the network element manageable by the operations system portion;
processing the adaptation information in the operations system portion;
configuring at least one application in the operations system portion on a basis of the adaptation information; and
executing a management process of the network element by the operations system portion.

2. The method according to claim 1, wherein the adaptation information comprises identification data of the network element.

3. The method according to claim 2, the method further comprising:
contacting, after the processing the adaptation information, a library network part;
requesting, from the library network part, additional adaptation information for the network element based on the identification data; and
receiving, from the library network part, the additional adaptation information for the network element,
wherein the configuring the at least one application of the operations system portion is based on the additional adaptation information received from the library network part.

4. The method according to claim 2, wherein the identification data of the network element comprises type and release information of the network element.

5. The method according to claim 2, further comprising determining, after the processing the adaptation information, a sort of the adaptation information to distinguish whether the network element transmitted the metadata or the identification data.

6. The method according to claim 5, wherein when the determining results in that the adaptation information comprises the metadata, the configuring the at least one applications of the operations system portion is based on the adaptation information from the network element.

7. The method according to claim 5, wherein when the determining results in that the adaptation information comprises the identification data, the method further comprises:
contacting, after the determining the sort of adaptation information, a library network part;
requesting, from the library network part, additional adaptation information for the network element based on the identification data; and
receiving, from the library network part, the additional adaptation information for the network element,
wherein the configuring the at least one application of the operations system portion is based on the additional adaptation information received from the library network part.

8. The method according to claim 1, wherein the configuring includes configuring a configuration of at least one of a configuration management subcomponent, a performance management subcomponent, an accounting management subcomponent, a security management subcomponent, and a fault management subcomponent.

9. The method according to claim 8, wherein the configuration comprises at least one of an addition of properties needed for visualization of the network element in a user interface, limitations of an operation and maintenance protocol implementation, extensions of the operation and maintenance protocol implementation, structure of transferred configuration management data, structure and meaning of transferred performance management data, additional help texts for fault management events, and adaptations to generic operations system applications.

10. The method according to claim 1, wherein the configuring comprises configuring at least one of a reconfiguration of a database scheme, a modification of relevant database tables, a creation of new database tables, a modification of a graphical user interface, and a modification of a messaging system.

11. The method according to claim 1, further comprising requesting the adaptation information from the network element by the operations system portion after establishment of a physical connection between the network element and the operations system portion.

12. The method according to claim 1, wherein the method is implemented in a communication management network.

13. A system, comprising:
a network element; and
an operations system portion,
wherein the network element is configured to transmit adaptation information to the operations system portion, after the network element is physically connected to the operations system portion, wherein the adaptation information comprises metadata defining parts of the network element manageable by the operations system portion, and
wherein the operations system portion includes a processor configured to process the adaptation information in the operations system portion, to configure at least one application in the operations system portion based on the adaptation information, and to execute a management process of the network element.

14. An apparatus, comprising:
a receiver configured to receive, after physically connecting a network element to the apparatus, adaptation information from the network element, wherein the adaptation information comprises metadata defining parts of the network element manageable by the apparatus; and
a processor configured to process adaptation information, to configure at least one application in the apparatus based on the adaptation information, and to execute a management process of the network element;
wherein the adaptation information comprises identification data of the network element;
wherein the processor is further configured to determine a sort of the adaptation information to distinguish whether the metadata or the identification data are received.

15. The apparatus according to claim 14, wherein the processor is further configured to: contact a library network part being part of the communication management network system; and request, from the library network part, additional adaptation information for the network element based on the identification data comprised in the adaptation data from the network element, configure the at least one application of the apparatus based on the additional adaptation information being requested and received from the library network part.

16. The apparatus according to claim 14, wherein the identification data of the network element comprises type and release information of the network element.

17. The apparatus according to claim 14, wherein when the processor determines that the adaptation information comprises the metadata, the processor is configured to configure the at least one application of the apparatus based on the adaptation information from the network element.

18. The apparatus according to claim 14, wherein the processor is further configured to:
contact a library network part being part of the communication management network system; and request, from the library network part, additional adaptation information for the network element based on the identification data comprised in the adaptation data from the network element, wherein when the processor determines that the adaptation information comprises the identification data, the processor is configured to configure the at least one application of the apparatus based on the additional adaptation information being requested and received from the library network part.

19. The apparatus according to claim 14, wherein the processor is further configured to configure at least one of a configuration management subcomponent, a performance management subcomponent, an accounting management subcomponent, a security management subcomponent, and a fault management subcomponent.

20. The apparatus according to claim 19, wherein the processor is further configured to execute a configuration comprising at least one of an addition of properties needed for visualization of the network element in a user interface, limitations of an operation and maintenance protocol implementation, extensions of the operation and maintenance protocol implementation, structure of transferred configuration management data, structure and meaning of transferred performance management data, additional help texts for fault management events, and adaptations to generic operations system applications.

21. The apparatus according to claim 14, wherein the processor is further configured to execute at least one of a reconfiguration of a database scheme, a modification of relevant database tables, a creation of new database tables, a modification of a graphical user interface, and a modification of a messaging system.

22. The apparatus according to claim 14, wherein the processor is further configured to request, from the network element, the adaptation information after establishment of a physical connection between the network element and the apparatus.

23. An apparatus, comprising:
a transmitter configured to transmit, after the apparatus is physically connected to an operations system portion, adaptation information to the operations system portion usable by the operations system portion to configure at least one application in the operations system portion, wherein the adaptation information comprises metadata defining parts of the apparatus manageable by the operations system portion,
wherein the operations system portion is configured to execute a management process of the apparatus.

24. The apparatus according to claim 23, wherein the adaptation information comprises identification data of the apparatus.

25. The apparatus according to claim 24, wherein the identification data of the apparatus comprises type and release information of the apparatus.

26. The apparatus according to claim 23, wherein the adaptation information is usable to configure at least one of a configuration management subcomponent, a performance management subcomponent, an accounting management subcomponent, a security management subcomponent, and a fault management subcomponent.

27. The apparatus according to claim 26, wherein a configuration for the at least one application comprises at least one of an addition of properties needed for the visualization of the apparatus in a user interface, limitations of an operation and maintenance protocol implementation, extensions of the operation and maintenance protocol implementation, structure of transferred configuration management data, structure and meaning of transferred performance management data, additional help texts for fault management events, and adaptations to generic operations system applications.

28. The apparatus according to claim 23, wherein a configuration for the at least one application comprises at least one of a reconfiguration of a database scheme, a modification of relevant database tables, a creation of new database tables, a modification of a graphical user interface, and a modification of a messaging system.

29. The apparatus according to claim 23, further comprising a processor configured to receive and process a request from the operations system portion for the adaptation information after establishment of a physical connection between the apparatus and the operations system portion.

30. A method, comprising:
 transmitting, after a network element is physically connected to an operations system portion, adaptation information to the operations system portion usable by the operations system portion to configure at least one application in the operations system portion, wherein the adaptation information comprises metadata defining parts of the network element manageable by the operations system portion,
 wherein the operations system portion is configured to execute a management process of the network element.

31. The method according to claim 30, further comprising receiving and processing a request from the operations system portion for the adaptation information after establishment of a physical connection between the network element and the operations system portion.

32. A non-transistory computer-readable storage medium encoded with instructions configured to control a processor to perform a process, the process comprising:
 receiving, after a network element is physically connected to an operations system portion, adaptation information from the network element in the operations system portion, wherein the adaptation information comprises metadata defining parts of the network element manageable by the operations system portion;
 processing the adaptation information in the operations system portion; configuring at least one application in the operations system portion on a basis of the adaptation information; and
 executing a management process of the network element by the operations system portion.

33. A non-transistory computer-readable storage medium encoded with instructions configured to control a processor to perform a process, the process comprising:
 transmitting, after a network element is physically connected to an operations system portion, adaptation information to the operations system portion usable by the operations system portion to configure at least one application in the operations system portion, wherein the adaptation information comprises metadata defining parts of the network element manageable by the operations system portion, wherein the operations system portion is configured to execute a management process of the network element.

* * * * *